(12) United States Patent
Laue et al.

(10) Patent No.: US 9,592,633 B2
(45) Date of Patent: *Mar. 14, 2017

(54) POLYMER SEAMING USING DIFFUSION WELDS

(75) Inventors: Gregory Laue, Huntsville, AL (US);
William Clayton, Huntsville, AL (US);
Mark Johnson, Madison, AL (US);
Timothy Wright, Huntsville, AL (US);
Kevin Melton, Harvest, AL (US);
Garrett Poe, Madison, AL (US)

(73) Assignee: NeXolve Corporation, Huntsville, AL (US)

( * ) Notice: Subject to any disclaimer, the term of this patent is extended or adjusted under 35 U.S.C. 154(b) by 955 days.

This patent is subject to a terminal disclaimer.

(21) Appl. No.: 13/302,382

(22) Filed: Nov. 22, 2011

(65) Prior Publication Data
US 2012/0061011 A1   Mar. 15, 2012

Related U.S. Application Data

(60) Division of application No. 12/616,740, filed on Nov. 11, 2009, now Pat. No. 8,129,011, which is a
(Continued)

(51) Int. Cl.
*B29C 65/00* (2006.01)
*B29C 65/02* (2006.01)
(Continued)

(52) U.S. Cl.
CPC ............ *B29C 65/006* (2013.01); *B29C 65/02* (2013.01); *B29C 65/18* (2013.01); *B29C 66/0044* (2013.01); *B29C 66/1122* (2013.01); *B29C 66/1142* (2013.01); *B29C 66/21* (2013.01); *B29C 66/232* (2013.01); *B29C 66/344* (2013.01); *B29C 66/348* (2013.01); *B29C 66/43* (2013.01); *B29C 66/712* (2013.01); *B29C 66/723* (2013.01); *B29C 66/7394* (2013.01); *B29C 66/73111* (2013.01);
(Continued)

(58) Field of Classification Search
USPC ...... 156/258, 290, 292, 304.5, 308.2, 308.4, 156/544
See application file for complete search history.

(56) References Cited

U.S. PATENT DOCUMENTS 3,472,721 A * 10/1969 Abramson et al. ........... 156/366
3,906,308 A *  9/1975 Amason et al. .............. 361/218
(Continued)

OTHER PUBLICATIONS

Dupont "Bulletin GS-96-7" available as KaptonGeneral Properties.pdf from circlex.com published Sep. 2000.*
(Continued)

*Primary Examiner* — John Goff
(74) *Attorney, Agent, or Firm* — Jeremy A. Smith; Bradley Arant Boult Cummings LLP

(57) ABSTRACT

The present invention is a method for seaming a polymeric material. The method involves forming an interface between a plurality of separate polymeric sheets of materials. Next, heat and pressure are applied to facilitate the diffusion of the polymer molecules at the interface. A diffusion weld is made when the polymer molecules diffuse across the interface.

4 Claims, 3 Drawing Sheets

Related U.S. Application Data continuation-in-part of application No. 11/740,267, filed on Apr. 25, 2007, now Pat. No. 7,641,758.

(51) Int. Cl.

| | |
|---|---|
| *B29C 65/18* | (2006.01) |
| *B64G 1/22* | (2006.01) |
| *B64G 1/40* | (2006.01) |
| *B64G 1/44* | (2006.01) |
| *B64G 1/54* | (2006.01) |
| *C08G 73/10* | (2006.01) |
| *C08G 73/22* | (2006.01) |
| *C08L 79/04* | (2006.01) |
| *C08L 79/08* | (2006.01) |
| *B29K 27/18* | (2006.01) |
| *B29K 67/00* | (2006.01) |
| *B29K 71/00* | (2006.01) |
| *B29K 77/00* | (2006.01) |
| *B29K 79/00* | (2006.01) |
| *B29K 81/00* | (2006.01) |
| *B29K 101/10* | (2006.01) |
| *B29K 105/00* | (2006.01) |
| *B29L 9/00* | (2006.01) |
| *B29L 31/30* | (2006.01) |

(52) U.S. Cl.
CPC .. *B29C 66/73115* (2013.01); *B29C 66/73941* (2013.01); *B29C 66/80* (2013.01); *B29C 66/81422* (2013.01); *B29C 66/836* (2013.01); *B29C 66/8362* (2013.01); *B29C 66/91411* (2013.01); *B64G 1/226* (2013.01); *B64G 1/407* (2013.01); *B64G 1/44* (2013.01); *B64G 1/54* (2013.01); *C08G 73/105* (2013.01); *C08G 73/1046* (2013.01); *C08G 73/1067* (2013.01); *C08G 73/1071* (2013.01); *C08G 73/22* (2013.01); *C08L 79/04* (2013.01); *C08L 79/08* (2013.01); *B29C 66/303* (2013.01); *B29C 66/435* (2013.01); *B29C 66/71* (2013.01); *B29C 66/72321* (2013.01); *B29C 66/73921* (2013.01); *B29C 66/919* (2013.01); *B29C 66/91421* (2013.01); *B29C 66/91935* (2013.01); *B29C 66/91941* (2013.01); *B29C 66/91943* (2013.01); *B29C 66/91945* (2013.01); *B29K 2027/18* (2013.01); *B29K 2065/00* (2013.01); *B29K 2067/00* (2013.01); *B29K 2071/00* (2013.01); *B29K 2077/00* (2013.01); *B29K 2079/08* (2013.01); *B29K 2079/085* (2013.01); *B29K 2081/04* (2013.01); *B29K 2101/10* (2013.01); *B29K 2105/0079* (2013.01); *B29L 2009/00* (2013.01); *B29L 2031/3097* (2013.01); *Y10T 428/19* (2015.01); *Y10T 428/197* (2015.01)

(56) References Cited

U.S. PATENT DOCUMENTS

| | | | | |
|---|---|---|---|---|
| 4,283,839 | A * | 8/1981 | Gursky | 228/170 |
| 4,931,126 | A * | 6/1990 | McCarville et al. | 156/304.6 |
| 5,302,457 | A * | 4/1994 | Sheahan | 428/411.1 |
| 5,486,249 | A * | 1/1996 | Valaitis et al. | 156/71 |
| 5,626,314 | A * | 5/1997 | Reynolds et al. | 244/171.7 |
| 6,132,541 | A * | 10/2000 | Heaton | 156/82 |
| 7,641,758 | B2 * | 1/2010 | Laue et al. | 156/308.4 |
| 2004/0067705 | A1 * | 4/2004 | Ton-That et al. | 442/65 |
| 2005/0277096 | A1 * | 12/2005 | Hendrickson et al. | 434/262 |
| 2008/0264561 | A1 * | 10/2008 | Laue et al. | 156/308.4 |

OTHER PUBLICATIONS

Printout from archive.org evidencing that KaptonGeneral Properties.pdf was available at circlex.com on Mar. 17, 2006 which printout was generated Oct. 22, 2012.*

* cited by examiner

POLYMER SEAMING USING DIFFUSION WELDS

This application is a divisional patent application of, and claims priority to, U.S. patent application Ser. No. 12/616,740, which was filed on Nov. 11, 2009 and issued as U.S. Pat. No. 8,129,011 on Mar. 6, 2012, where U.S. patent application Ser. No. 12/616,740 is a continuation in part of, and claims priority to, U.S. patent application Ser. No. 11/740,267, which was filed on Apr. 25, 2007 and issued as U.S. Pat. No. 7,641,758 on Jan. 5, 2010.

BACKGROUND OF THE INVENTION

Field of the Invention

The invention relates generally to the manufacture of polymer films. More specifically, the invention relates to polymer films that have been seamed and a method of seaming sheets of polymeric material together with diffusion welding.

Background Art

Polymer films are frequently produced in a rolled form. Such rolls are often seamed together to combine multiple rolls, to make a longer roll, or to make a larger polymeric sheet structure. The films can be thin, such as 2 mils thick or less, but the films can also be thicker. Thin sheets are often sensitive to mechanical tears and contamination. Some materials are not as strong as others, so thin sheets are even more prone to mechanical tears, rips, or other damages.

Thermoset plastics are polymeric materials that irreversibly cure. The cure may result from heat, irradiation, or a reaction. The reaction can be between two different compounds, such as with an epoxy. Some polymers are formed with two different types of monomers, such as a polyimide. Most polyimides are considered an AA-BB type polymer because two different classes of monomers are used to produce the polyimide polymer. One class of monomer is called an acid monomer, and is usually in the form of a dianhydride. The other type of monomer is usually a diamine, or a diamino monomer.

Thermoset plastics often have no melting point. The thermoset plastic may decompose before melting, or the thermoset plastic may begin decomposing as it approaches its melting point. Thermoset plastics will generally have a glass transition temperature, where the plastic becomes less brittle and softer above the glass transition temperature. Because thermoset plastics do not have a true melting point, or they begin to decompose as they approach their melting point, melt welding is not effective in joining separate pieces. Other techniques are needed to join sheets of thermoset plastic together. Thermoplastic materials, on the other hand, can be melted without significant decomposition. Sheets of thermoplastic materials can be overlapped and melted together, which is referred to as melt welding. Thermoplastic materials do have a glass transition temperature which is lower than its melting point. Polymeric materials can be thermoplastic or thermoset.

Polyimides are one type of thermoset plastic with many desirable characteristics. Other thermoset plastics include polybenzoxazoles and epoxies. There are also examples of polyimides, polybenzoxazoles, and epoxies which are thermoplastic. Polyimide sheets can be used for space applications where weight is an important factor. Thinner sheets weigh less, but still need to be strong enough to function. Also, the temperature in space can change significantly and rapidly. If two different materials are joined together, and the different materials have different coefficients of thermal expansion (CTEs), the rapid and large temperature changes can cause the materials to separate. An adhesive and a polymer will often have different CTEs.

Thin sheets of polyimides are commonly used on satellites and other space flight equipment. Thin sheets are also referred to as films in this disclosure. They are typically thin polymer sheets which may have an applied reflective metallized evaporative coating. These sheets are used as solar shields, solar concentrators, solar sails, etc. A reflective membrane may be used to protect orbital structures and equipment such as satellites from direct exposure to solar radiant flux. Alternatively, a reflective membrane may be used to concentrate solar energy on equipment such as a solar panel that powers a satellite. Other coatings can also be used for various applications.

Prior art techniques of seaming include bonding the materials with an adhesive or alternatively employing a mechanical fastener. However, the application of the adhesive seaming chemicals is challenging and prone to contamination. Additionally, commonly used adhesives, such as acrylic-based or silicone-based, lose mechanical strength and increase in stiffness at temperatures below their glass transition temperature (Tg), such as temperatures encountered in space. Differences in the CTE between the polymer and the adhesive can also lead to premature seam failure. A mechanical fastener, such as stitching with thread, is prone to tearing especially if single layers of materials are seamed together. Consequently, a method for effectively seaming thin polymer sheets is needed.

SUMMARY OF THE INVENTION

In some aspects, the invention relates to a plurality of thermoset plastic sheets diffusion welded together. In other aspects, the invention relates to a method for seaming a polymeric material using diffusion welding. In other aspects, the invention relates to a method for seaming a polymeric material using diffusion welding, where the polymeric material has a coating. The diffusion welding involves forming an overlapping interface of the polymeric material, and applying heat and pressure to the interface to form a diffusion weld between the materials.

BRIEF DESCRIPTION OF THE DRAWINGS

It should be noted that identical features in different drawings are shown with the same reference numeral.

DETAILED DESCRIPTION

The Diffusion Weld

Figure 1:
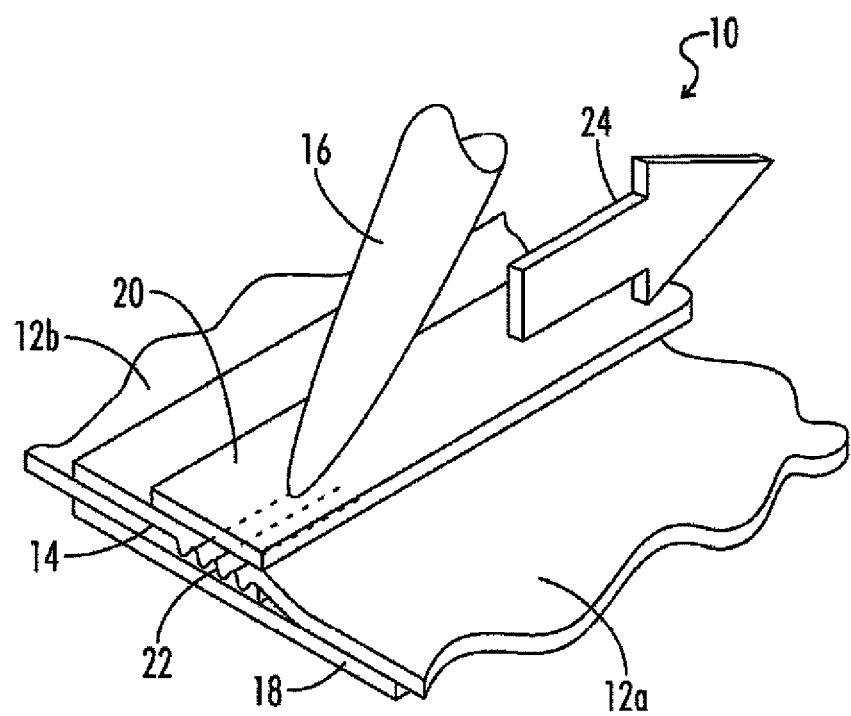
FIG. 1 shows a thermal seaming method that utilizes a heated stylus in accordance with one embodiment of the present invention.

A method for seaming thin film polymers has been developed. The method is effective for at least some thermoset polymers which are not conducive to melt welding. Thermoset polymers which can be seamed include at least some polyimides and some polybenzoxazoles. Examples of thin film polyimides include, but are not specifically limited to, PMDA/ODA (KAPTON®), and 6FDA/4BDAF (CP1), where PMDA stands for pyromellitic dianhydride, ODA stands for oxydianiline, 6FDA stands for 4,4'-(hexafluoroisopropylidene)diphthalic anhydride, and 4BDAF stands for 2,2-bis[4-(4aminophenoxy)phenyl]hexafluoropropane.

The method includes the application of heat and pressure to thermally weld two layers of material together. The method produces a weld called a "diffusion weld" that is acceptably strong and effective under a wide range of temperature conditions. The method is effective in seaming certain thin polymeric materials that may have a thickness of less than 2 mils, or even thinner materials with a thickness of less than 5 microns. The method is most beneficial for thermoset polymers because melt welding is not a viable option, but the method is also effective on certain thermoplastic materials. The method can also be effective for thicker polymeric materials.

"Diffusion welding" involves joining polymers by applying a necessary amount of heat and pressure for a defined period of time. This results in a plastic flow of material at the interface between the two bodies of materials. The plastic flow removes, agglomerates, or buries surface contaminants, flattens surface asperities, and brings the bodies into intimate contact. The molecules of the separate pieces of polymeric material are diffused and repositioned across the interface of the bodies until the interface becomes indistinct and energy is required to separate the bodies. Some polymeric molecules will become repositioned such that the molecules are present in more than one polymeric piece, so the molecules serve to bind the separate pieces together.

In order for diffusion welding to occur, the edges of the polymeric sheet to be seamed (called a "faying surface") must be overlapped and heated to a suitable bonding temperature. The overlapped faying surfaces are referred to as an interface. Many polymeric materials have a distinct glass transition temperature ($T_g$) where the material softens and distorts. The suitable bonding temperature for diffusion welding can be within about 15 degrees centigrade below the $T_g$ to about 15 degrees centigrade above the $T_g$. It is also possible to apply temperatures more than 15 degrees centigrade above the $T_g$ for shorter periods of time, so the time of application and the temperature should be considered together when forming a diffusion weld. There may also be instances where a temperature of less than 15 degrees centigrade below the Tg can be used with the proper application time. Once heated, pressure is added to the interface in order to promote diffusion of the softened material across the interface of the bodies. It is also possible to apply pressure first, and then temperature, or to apply pressure and temperature at the same time. The exact temperature needed, the amount of pressure needed, and the application times for the temperature and pressure are determined by experimentation for each different application. Factors which can affect the temperature, pressure, and bonding time include the materials being diffusion welded, the thickness of the materials and/or coatings, the types of coatings, and other process conditions.

One advantage of the present invention is that a seam created by the disclosed invention exhibits decreased tear propagation at the seam points. Another advantage is that the present invention eliminates the need for adhesives to join two materials. This prevents thermal deformations due to inherent CTE differences of the materials and the adhesive. These thermal deformations can present challenges at temperatures below the $T_g$ of adhesives when the modulus of the adhesives tends to increase. Another advantage is that characteristic conductivity of conductive materials, such as carbon-filled polyimide, is retained at the seaming point.

Methods of Producing the Diffusion Weld

In one embodiment of the present invention, the polymeric materials are heated by contact with a heating tool that also applies pressure to the interface. FIG. 1 shows one example of a thermal seaming system 10 that uses a heated stylus 16. A first sheet of a polymeric material 12a and a second sheet of polymeric material 12b are positioned with their respective faying surfaces forming an overlapping interface 14. The overlapped interface 14 can be about one inch across, but wider overlaps allow more area for a larger diffusion weld, and smaller overlaps can also be used. The interface 14 is placed on an insulative backing 18 and a protective overlay 20 can be placed over the top of the interface 14. The heated stylus 16 is then dragged 24 across the overlay 20. The stylus 16 applies both heat and pressure to the interface 14 and forms a continuous diffusion weld 22.

Figure 2:
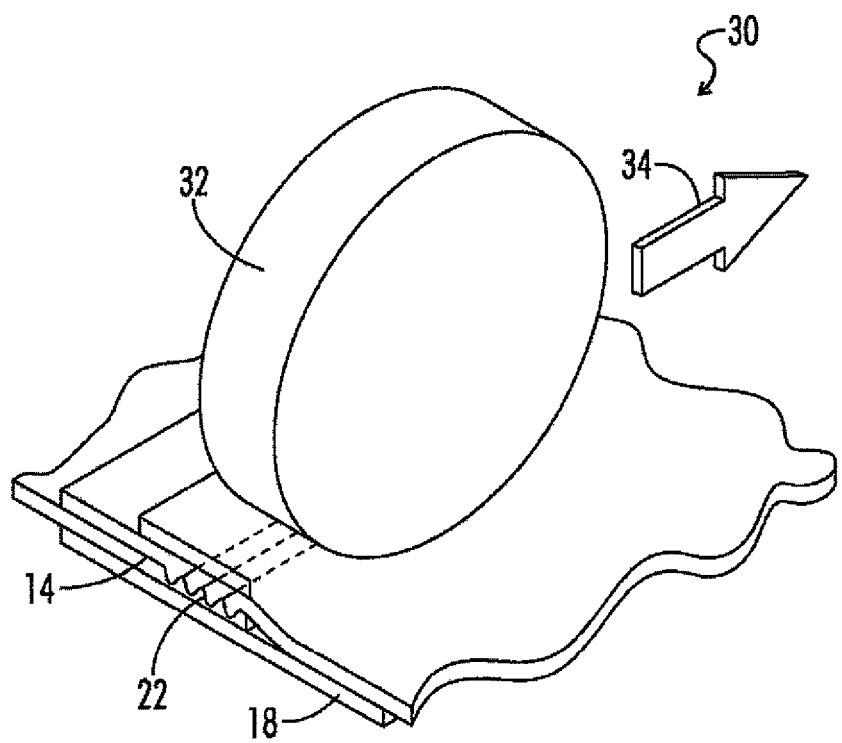
FIG. 2 shows a thermal seaming method that utilizes a heated roller in accordance with one embodiment of the present invention.

FIG. 2 shows an alternative thermal seaming system embodiment 30 of the present invention that utilizes a heated wheel 32. In this embodiment, a heated wheel 32 is rolled 34 across the interface 14 to apply both heat and pressure that forms a continuous diffusion weld 22. While this embodiment is shown without a protective overlay, it should be understood that embodiments exist for diffusion welding with or without a protective overlay. The need for a protective overlay is determined by experimentation based on several factors, including the materials being diffusion welded, the thickness of the materials, the type of apparatus applying the heat and pressure, the diffusion welding temperature and pressure used, and the application time for the temperature and pressure application.

Figure 3:
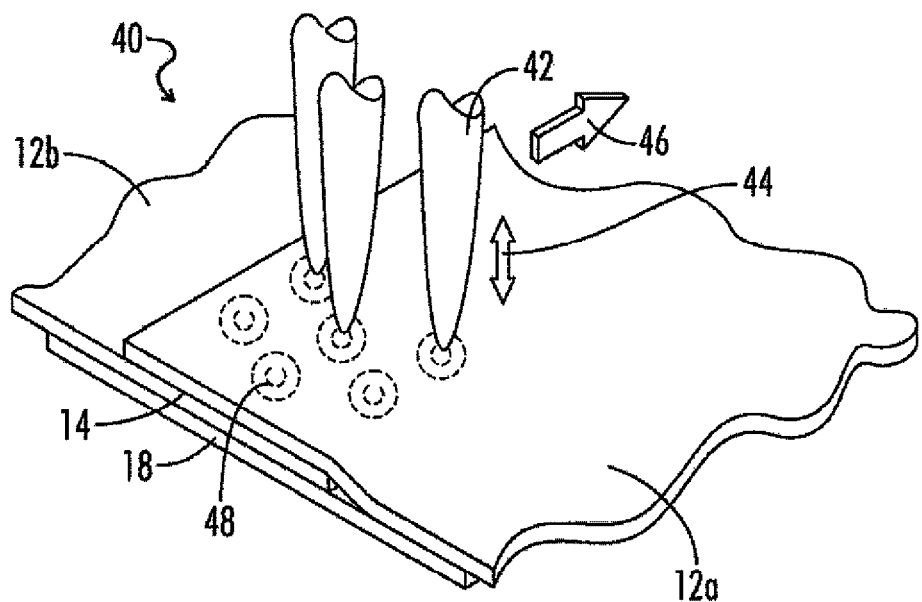
FIG. 3 shows a thermal seaming method that utilizes a heated plunger in accordance with one embodiment of the present invention.

FIG. 3 shows yet another thermal seaming system embodiment 40 of the present invention that utilizes a plurality of heated plungers 42. Alternate embodiments could use a single heated plunger 42. In this embodiment, the heated plungers 42 move intermittently in vertical 44 and horizontal 46 directions applying heat and pressure at various points along the interface 14. The effect is to create multiple "spot" diffusion welds 48. The plungers 42 apply heat and pressure to produce spot diffusion welds 48, and then move vertically 44 out of contact with the interface 14. The plungers 42 then move horizontally 46 to re-position themselves for the next spot diffusion welds 48. Then the plungers 42 move vertically 44 downward into contact with the interface 14, and produce the next spot diffusion welds 48 by applying heat and pressure. Reference to the plunger 42 moving horizontally or vertically means the plunger motion includes a horizontal or vertical component, so the plunger 42 can move both horizontally and vertically at the same time. Vertical motion is used to contact or separate the plunger 42 from the interface, and horizontal motion is used to re-position the plunger 42 for another spot diffusion weld 48.

Figure 4:
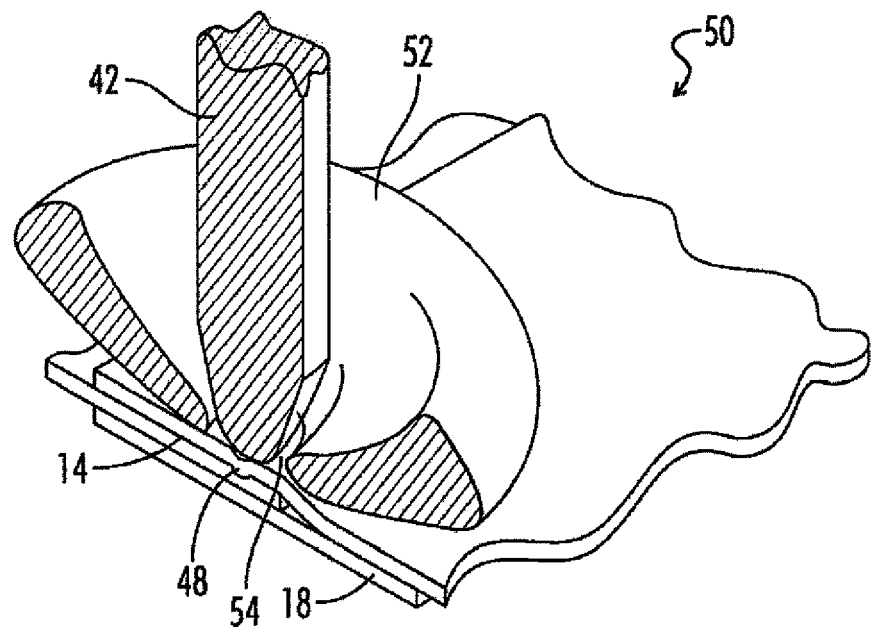
FIG. 4 shows a thermal seaming method that utilizes a heated plunger with a local tensioner.

The plungers 42 can be used to produce spot diffusion welds 48, instead of the continuous diffusion welds discussed above. The plungers 42 could also be dragged to produce continuous diffusion welds, or a mixture of spot and continuous diffusion welds, as desired. The plungers 42 can provide simpler temperature control mechanisms, because the diffusion welding process is intermittent and focused at the end of the plunger 42. Also, the contact end of the plunger 42 can have a small area, so a high pressure can be applied at the spot of the diffusion weld. However, the spot diffusion welds 48 may not produce a complete seal between the first and second polymeric sheets 12a, 12b. Each spot diffusion weld 48 may be isolated from every other spot diffusion weld 48, meaning each spot diffusion weld 48 does not contact any other spot diffusion weld 48. When the spot diffusion welds 48 are isolated, a complete seal may not be formed between the first and second polymeric sheets 12a, 12b, Most welds of materials with a non-zero CTE have differential shrinkage distortion of the joined bodies upon cooling. This is the result of temperature gradients which are characteristic in practically all welding techniques. This distortion is undesirable for many applications using diffusion welded thin film membranes. It can be reduced by locally tensioning the sheets of polymeric material 12a, 12b in the vicinity of the diffusion weld during the welding process. When the tension is released, the local residual compression stress tends to counteract the local residual tensile stresses that result from the weld. FIG. 4 shows one embodiment of the thermal seaming system 50 that utilizes a heated plunger 42 in conjunction with a local tensioner 52. In this embodiment, the tensioner 52 is circular-shaped. The plunger 42 contacts the interface 14 through a tensioner opening 54 to create the diffusion weld 48.

The examples shown in FIGS. 1-4 demonstrate diffusion welding of shear or overlapping joints. Other embodiments of the present invention could be used to produce butt or tensile joints. In these embodiments, the faying surfaces are abutted rather than overlapped, so the polymeric sheets are positioned edge to edge. A separate seaming sheet can then be positioned over the abutted edges of the polymeric sheets, so there is an overlapped interface. The heated bonding tool is brought in contact with the overlapped interface to form a diffusion weld.

While these embodiments show a single device that provides both heat and pressure to the interface, it should be understood that alternative embodiments could use multiple devices to provide these as desired. Further, the temperatures and pressures applied will depend on the specific characteristics of each material. However, it is common for the suitable bonding temperature to exceed 500 F yet still not reach the melting point of the material. If two dissimilar materials, such as a polyimide and non-polyimide, are being bonded then the material with the lower glass transition temperature ($T_g$) and/or melting point should be heated to a lesser temperature. One way this may be accomplished is by placing a heat source directly on the material with the higher $T_g$ while placing the lower $T_g$ material underneath the higher $T_g$ material to avoid direct contact with the heat source. The material with the higher $T_g$ serves to insulate the material with the lower $T_g$ to some extent.

Polymeric Materials

While the present invention has been described for diffusion welding two or more similar thermoset plastic materials, the methods disclosed may also be effective to diffusion weld two or more thermoplastic plastic materials or even to diffusion weld two or more dissimilar materials. For example, the various embodiments could be used to connect a polyimide with a different polyimide material such as diffusion welding the polyimide associated with the trademark KAPTON® and CP1 together. Other embodiments may involve seaming a thermoset plastic to any of the following polymers: polyamides (such as polymer associated with the trade name NYLON); polyesters such as poly(ethylene naphthalate) (PEN) or poly(ethylene terephthalate) (PET/polymers known by the trade name MYLAR); polyamide imide (PAI/polymers known by the trade name TORLON); polyether ketone (PEK); polyether ketone ketone (PEKK); polyether ether ketone (PEEK); polyether imide (PEI); polyphenylene sulfide (PPS); polyether sulfone (PES); polytetrafluoroethylene (PTFE); and polyphenylene (PARMAX). These materials are given as examples of alternative materials that may be diffusion welded to a thermoset plastic or to a thermoplastic plastic. It should be understood that other materials known in the art with similar performance characteristics could be used as well.

It is possible to diffusion weld thermoset materials with thermoplastic materials if the characteristics of the different polymers are acceptable. For example, some polyimides associated with the trademark KAPTON® have a $T_g$ higher than 300 degrees Celsius, and these KAPTON® polyimides can be diffusion welded to other materials with a melting point lower than the $T_g$ of KAPTON®. It is also possible to diffusion weld certain thermoplastic materials together. This can include separate sheets of one type of thermoplastic polymer, or separate sheets of different types of thermoplastic polymers.

Figure 5:
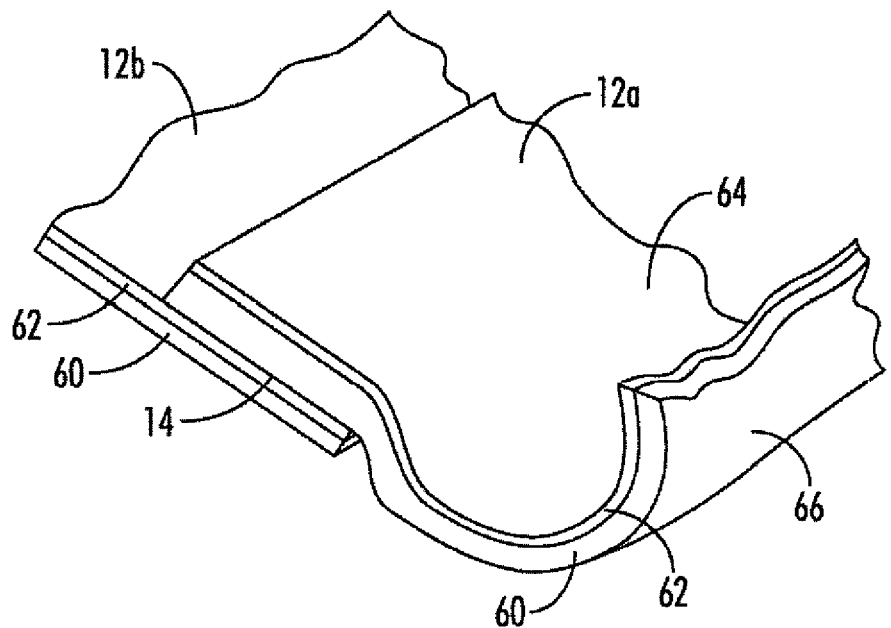
FIG. 5 shows polymeric sheets having a core and a coating, where the polymeric sheets are positioned to be diffusion welded.

Many polymeric sheets will include coatings of one type or another, and these coatings can affect diffusion welds. A polymeric sheet with a coating includes at least a core 60 and a coating 62, as seen in FIG. 5, where the core 60 is the base layer and the coating 62 is applied to the core 60. Coatings 62 can be on one side of a polymeric sheet 12a, or they can be on both sides of a polymeric sheet 12a. There can also be multiple coatings 62 on a polymeric sheet 12a. A polymeric sheet 12a can have a first type of coating 62 on a first side 64, and a different type of coating on the second side 66. Each side 64, 66 can have zero, one, two, or more coatings. The coatings can change the properties of the polymeric sheet 12a, so different coatings 62 and cores 60 are used for different applications.

Some coatings 62 can be at the interface 14 and not interfere with the diffusion weld, but other coatings can prevent or weaken the diffusion weld if present at the interface 14. For example, metallic coatings should not be between the layers in the interface 14 where the diffusion weld is produced. The metallic coating can be on a polymeric sheet 12a on a side facing away from another layer, so the metallic coating is not between layers in the interface 14. The coating 62 on polymeric sheet 12a is facing away from polymeric sheet 12b, and so the coating 62 on polymeric sheet 12a is not between layers in the interface 14. However, polyimide cores 60 with a polytetrafluoroethylene (PTFE) coating 62 or another fluorinated polymer, such as fluorinated ethylene propylene (FEP) and perfluoroalkoxy (PFA) can be diffusion welded with the coating 62 between the layers in the interface 14.

Polymeric sheets with metallic coatings cannot be diffusion welded if the metallic coating is between the polymers of the different sheets. One way to diffusion weld polymeric sheets with metallic coatings is to remove the metallic coating at the faying surface, so there is no coating in the overlapped interface. Alternatively, the polymeric sheets can be positioned with the faying surfaces abutted instead of overlapped, so the sheets are edge to edge. A separate seaming sheet can be positioned over the abutting edges on the side of the polymeric sheets which do not have a metallic coating, and the diffusion weld can be made in the interface. Other alternatives include coating the polymeric sheets after they have been seamed, or preventing a faying surface from being coated when the rest of the polymeric sheet receives the metallic coating.

Most experiments completed to date have involved diffusion welding two separate sheets of the same polymeric material. Diffusion welds have been found effective for certain materials, but more experimentation is needed to determine what materials and what mix of materials can be diffusion welded. Below is a list of materials for which the diffusion welding described above has been shown to work.

1. CP1 polyimide diffusion welded to CP1 polyimide;
2. KAPTON® polyimide diffusion welded to KAPTON® polyimide;
3. PTFE coated KAPTON® diffusion welded to PTFE coated KAPTON®;
4. Liquid crystalline polymer (LCP) polyester diffusion welded to LCP polyester;
5. CP1 filled with PTFE diffusion welded to CP1 filled with PTFE;
6. CP1 polyimide diffusion welded to KAPTON® polyimide;
7. PTFE-coated KAPTON® diffusion welded to uncoated KAPTON® polyimide;
8. FEP-coated KAPTON® diffusion welded to uncoated KAPTON® polyimide;
9. PFA-coated KAPTON® diffusion welded to uncoated KAPTON® polyimide;
10. LCP polyester diffusion welded to uncoated KAPTON® polyimide;

Composite Thermoset Plastic Sheets

Figure 6:
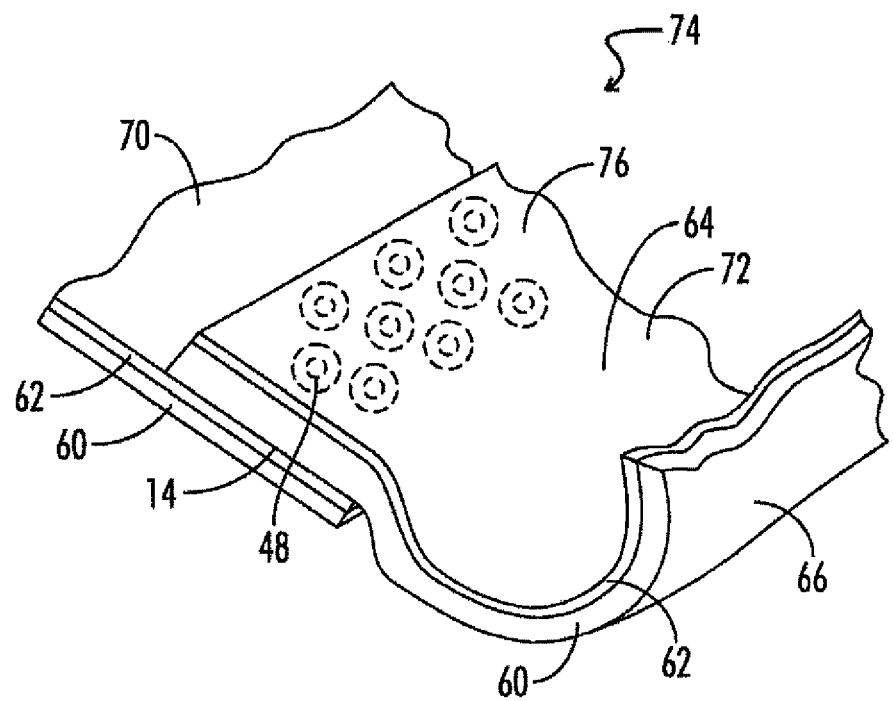
FIG. 6 shows a composite thermoset plastic sheet with a seam.

Thermoset plastics seamed together with diffusion welds can be produced with the techniques described above, as shown in FIG. 6. This would include a plurality of component thermoset plastic sheets, such as a first component thermoset plastic sheet 70 and a second component thermoset plastic sheet 72. A plurality of component thermoset plastic sheets 70, 72 can be diffusion welded together to form one larger composite thermoset plastic sheet 74. The composite thermoplastic sheet 74 can be recognized because there is no adhesive between the overlapping layers in the interface 14. The thermoset plastic of one component sheet 70 is directly bonded to the thermoset plastic of another component sheet 72. If melt welding had been attempted, weld points would show increased levels of decomposition. The use of stitching or other mechanical connectors is not needed, but could be used with diffusion welding if desired.

The composite thermoset plastic sheet 74 includes a seam 76 with overlapping layers of thermoset plastic. The seam 76 may not include any adhesive, but adhesive could also be added if desired. A seam 76 differs from an interface 14 in that a seam 76 includes a connection between at least two separate sheets, and an interface 14 is an area with overlapping layers either before or after the layers are connected. At least one of the component thermoset plastic sheets, such as the first component thermoset plastic sheet 70, may comprise a polyimide, but the thermoset plastic may also comprise polybenzoxazoles, polyimide filled polytetrafluoroethylene, other thermoset polymers, or combinations of the above.

A component thermoset plastic sheet 70 and/or 72 may also comprise a coating 62. Reference is now made to the first component thermoset plastic sheet 70 having the coating 62, but it is to be understood the second component thermoset plastic sheet 72 may have a coating 62 either instead of the first component thermoset plastic sheet 70, or as well as the first component thermoset plastic sheet 70. The coating 62 on the first component thermoset plastic sheet 70 can be in direct contact with the second component thermoset plastic sheet 72 at the seam 76. The coating may comprise polytetrafluoroethylene, polyimides, polybenzoxazoles, or other polymers. Other coatings 62, such as metallic coatings or certain other inorganic coatings, may be on the composite thermoset plastic sheet 74 but not present between the layers of the seam 76. The coating 62 shown on the second component thermoset plastic sheet 72 is not present between the layers of the seam 76. As such, a coating 62 not present between the layers of the seam 76 would not directly contact another component thermoset plastic sheet 74.

The composite thermoset plastic sheet 74 may be no more than 2 mils thick, and may even be less than 5 microns thick. It is also possible for the composite thermoset plastic sheet 74 to have a thickness greater than 2 mils. Reference to the thickness of the composite thermoset plastic sheet thickness refers to the thickness in the body of the composite thermoset plastic sheet 74, and not the thickness at the seam 76.

In one embodiment, the seam 76 is made from overlapping different edges of one component thermoset plastic sheet, such that the composite thermoset plastic sheet 74 forms a loop or belt. In this embodiment, the first component thermoset plastic sheet 70 and the second component thermoset plastic sheet 72 are represented by different edges of one single component thermoset plastic sheet. Alternatively, more than one component thermoset plastic sheets can be connected to form a loop or belt. Many other shapes can also be made by connecting different edges of component thermoset plastic sheets, such as a cube or a pyramid.

A composite plastic sheet can be formed between a component thermoset plastic sheet and a component thermoplastic plastic sheet. The composite plastic sheet therefore could include a component thermoset plastic sheet and a component thermoplastic plastic sheet diffusion welded together at the seam. Coatings can be applied similar to the component thermoset plastic sheets diffusion welded together to form a composite thermoset plastic sheet 74.

WORKING EXAMPLES

Specific working examples are provided below to further clarify specific embodiments of the current invention.

Example 1

Spot diffusion welds were produced in an overlapping seam between a 2 mil thick polyimide film associated with the trademark KAPTON HN and another 2 mil thick polyimide film associated with the trademark KAPTON HN. The overlapping seam was held in place by magnets placed above and below the seam such that the magnets were drawn towards each other. A backing was positioned under the seam such that the plunger presses the seam directly into the backing. The backing was formed of a 1/1000 inch thick KAPTON tape secured with a silicon pressure sensitive adhesive to a 1/16 inch thick ceramic wick. The 1/16 inch ceramic wick was positioned over a 1/8 inch thick nylon sheet, which was positioned over a rubber foam.

A plurality of heated plungers was pressed into the polyimide material at the seam, such that the polyimide seam was positioned directly between the heated plungers and the backing. The heated plungers had a tip with a 0.145 inch diameter circle, and the tip was heated to 650 degrees centigrade. The heated tip of the plunger was applied to the seam with a weight of 390 grams per tip for a total application time of 5 seconds. The heated plungers were then retracted from the seam, and repositioned for another spot weld. The process was repeated until the two polyimide sheets were thermally welded together.

Example 2

Spot diffusion welds were produced in an overlapping seam between a 2 mil thick polyimide film associated with the trademark KAPTON E and another 2 mil thick polyimide film associated with the trademark KAPTON E. The same process and parameters as described for Example 1 was used in Example 2.

Example 3

Spot diffusion welds were produced in an overlapping seam between a 2 mil thick polyimide film associated with the trademark KAPTON HN and a 2 mil thick polyimide film associated with the trademark KAPTON E. The same process and parameters as described for Example 1 was used in Example 3.

Example 4

Spot diffusion welds were produced in an overlapping seam between a 2 mil thick polyimide film associated with the trademark KAPTON HN and a 1 mil thick polyimide film associated with the trademark KAPTON HN. The same process and described for Example 1 was used in Example 4, except the plunger tip temperature was 630 degrees centigrade, the weight per tip was 300 grams, and the application time was 4 seconds.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of seaming polymeric sheets comprising:
   (a) providing a plurality of polymeric sheets, wherein at least one polymeric sheet comprises a first polyimide thermoset plastic, and another polymeric sheet comprises a second thermoset plastic comprising a polyimide;
   (b) overlapping the polymeric sheets to produce an interface such that the polymeric sheets are in direct contact at the interface with the first polyimide thermoset plastic directly contacting the second thermoset plastic; and
   (c) applying heat and pressure to the interface to diffusion weld the polymeric sheets.

2. A method for seaming polymeric sheets comprising:
   (a) providing a plurality of polymeric sheets, wherein at least one of the polymeric sheets comprises a first polyimide thermoset plastic, and another polymeric sheet comprises a second thermoset plastic comprising a polyimide;
   (b) overlapping polymeric sheets to produce an interface such that the polymeric sheets are in direct contact at the interface, and wherein the first polyimide thermoset plastic directly contacts the second thermoset plastic at the interface; and
   (c) applying heat and pressure to the interface at discrete spots to form a plurality of spot diffusion welds in the interface.

3. The method of claim 2 where the first polyimide thermoset plastic is the same material as the second thermoset plastic.

4. The method of claim 1 where the first polyimide thermoset plastic is the same material as the second thermoset plastic.

\* \* \* \* \*